US010513632B2

(12) United States Patent
Ozaki et al.

(10) Patent No.: US 10,513,632 B2
(45) Date of Patent: Dec. 24, 2019

(54) FILM-FORMING COMPOSITION AND FILM-FORMING METHOD USING SAME

(71) Applicant: AZ ELECTRONIC MATERIALS (LUXEMBOURG) S.A.R.L., Luxembourg (LU)

(72) Inventors: Yuki Ozaki, Shizuoka (JP); Noboru Satake, Shizuoka (JP); Shunji Kawato, Shizuoka (JP); Masakazu Kobayashi, Shizuoka (JP)

(73) Assignee: Ridgefield Acuisition, Luxembourg (LU)

( * ) Notice: Subject to any disclaimer, the term of this patent is extended or adjusted under 35 U.S.C. 154(b) by 669 days.

(21) Appl. No.: 14/913,821

(22) PCT Filed: Sep. 16, 2014

(86) PCT No.: PCT/JP2014/074401
§ 371 (c)(1),
(2) Date: Feb. 23, 2016

(87) PCT Pub. No.: WO2015/041207
PCT Pub. Date: Mar. 26, 2015

(65) Prior Publication Data
US 2016/0244638 A1    Aug. 25, 2016

(30) Foreign Application Priority Data
Sep. 17, 2013   (JP) ................... 2013-192148

(51) Int. Cl.
*C09D 183/14* (2006.01)
*B05D 3/04* (2006.01)
*B05D 3/06* (2006.01)
*B05D 7/04* (2006.01)
*C08J 7/04* (2006.01)
*C09D 183/16* (2006.01)
*C08G 77/62* (2006.01)
*C08G 77/26* (2006.01)

(52) U.S. Cl.
CPC ......... *C09D 183/14* (2013.01); *B05D 3/0486* (2013.01); *B05D 3/066* (2013.01); *B05D 3/067* (2013.01); *B05D 7/04* (2013.01); *C08J 7/047* (2013.01); *C09D 183/16* (2013.01); *C08G 77/26* (2013.01); *C08G 77/62* (2013.01); *C08J 2383/16* (2013.01); *C08J 2483/04* (2013.01); *C08J 2483/08* (2013.01)

(58) Field of Classification Search
CPC .......................... C09D 183/14; C09D 183/16; B05D 3/0486; B05D 3/066; B05D 3/067; B05D 7/04; C08J 7/047; C08J 2383/16; C08J 2483/04; C08J 2483/08; C08G 77/26; C08G 77/62
USPC ....................................................... 427/515
See application file for complete search history.

(56) References Cited

U.S. PATENT DOCUMENTS

| 5,747,623 | A | 5/1998 | Matsuo et al. |
| 5,914,151 | A | 6/1999 | Usuki |
| 6,255,373 | B1 * | 7/2001 | Akamatsu ............ C09D 183/04 106/287.11 |
| 6,329,487 | B1 | 12/2001 | Abel et al. |
| 8,427,620 | B2 | 4/2013 | Saito et al. |
| 2010/0159255 | A1 | 6/2010 | Lee et al. |
| 2010/0166977 | A1 | 7/2010 | Brand et al. |
| 2011/0091722 | A1 | 4/2011 | Koehne et al. |
| 2014/0127518 | A1 * | 5/2014 | Ishikawa ............. H01L 51/5253 428/447 |

FOREIGN PATENT DOCUMENTS

| JP | 1993-238827 | 9/1993 |
| JP | 1994-073340 B4 | 9/1994 |
| JP | 1996-112879 | 5/1996 |
| JP | 1996-176512 A2 | 7/1996 |
| JP | 1996-325700 A2 | 12/1996 |
| JP | 10-279362 A | 10/1998 |
| JP | 2000-26727 A | 1/2000 |
| JP | 2009-503157 A | 1/2009 |
| JP | 2010-167777 A | 8/2010 |
| JP | 2010-190933 A | 9/2010 |
| JP | 2011-173057 A | 9/2011 |
| JP | 2011-194766 A | 10/2011 |
| JP | 2012-6154 A | 1/2012 |
| JP | 2012-106433 A | 6/2012 |
| JP | 2012-116101 A2 | 6/2012 |
| JP | 2012-148416 A | 8/2012 |
| WO | 2009124857 A2 | 10/2009 |

(Continued)

OTHER PUBLICATIONS

Machine English Abstract translation of JP2012-116101A, Jun. 21, 2012.

(Continued)

*Primary Examiner* — Ling Siu Choi
*Assistant Examiner* — Ronald Grinsted
(74) *Attorney, Agent, or Firm* — Francis M. Houlihan

(57) ABSTRACT

[Problem] To provide a film forming composition and a method for preparing a film with which it is possible to form a film having excellent gas barrier performance.

[Means for Solution] Disclosed is a film forming composition comprising: a polysiloxane that does not include a hydroxyl group or a carboxyl group; a polysilazane; and an organic solvent. Also disclosed is a method for preparing a film comprising: coating a substrate with said composition; and exposing the same to light.

20 Claims, No Drawings

(56) References Cited

FOREIGN PATENT DOCUMENTS

WO         2012173040 A1    12/2012
WO    WO-2012173040 A1 * 12/2012   ......... H01L 51/5253

OTHER PUBLICATIONS

Machine English Abstract translation of JP1996-176512A2, Jul. 9, 1996.
Machine English Translation of JP1993-238827, Sep. 17, 1993.
Machine English English Abstract Translation, JP1994-073340, Sep. 14, 1994.

* cited by examiner

FILM-FORMING COMPOSITION AND FILM-FORMING METHOD USING SAME

This application is a United States National Stage Patent Application under 35 U.S.C. § 371 of International Patent Application No. PCT/JP2014/074401, filed Sep. 16, 2014 which claims priority to Japanese Patent Application No. 2013-192148, filed Sep. 17, 2013, the contents of which are being hereby incorporated herein by reference.

BACKGROUND OF THE INVENTION

Technical Field

The present invention relates to a film forming composition for preparing a film having excellent gas barrier performance, which can be utilized to produce display devices and semiconductor devices, and a method for preparing a film using the same.

Background Art

Silicic films are used for various applications in the manufacturing field of semiconductor devices due to their relatively high hardness and sealing property. Specifically, they are used for the applications such as a hard coat film of a substrate or circuit, a gas barrier film, a substrate strength enhancing film. As such silicic films, various ones have been investigated.

Among them, a method for preparing a coating film having, in particular, excellent gas barrier performance has been studied. In those methods, it is general to use polysilazane as a film forming material. For example, a method for preparing a gas barrier film comprising laminating a plurality of gas barrier film (Patent Document 1), a gas barrier film prepared by forming an ultraviolet cutting layer and a gas barrier film, respectively on both sides of a substrate (Patent Document 2), and a gas barrier film comprising a bleed out preventing layer, a layer having UV cutting property, and optionally a fluororesin layer (Patent Document 3) are respectively disclosed, in either of which polysilazane material is used in a part of gas barrier film. In addition, Patent Document 4 discloses a method for preparing a gas barrier film by irradiating a polysilazane film containing a catalyst with vacuum ultraviolet light (wavelength: 230 nm or shorter) and ultraviolet ray (wavelength: 230 to 300 nm) in the presence of water vapor, and Patent Document 5 discloses a method for preparing a gas barrier film by irradiating a coating film formed from polysilazane composition containing a transition metal with vacuum ultraviolet light (wavelength: 230 nm or shorter) in a nitrogen atmosphere.

However, according to the study by the present inventors, the film prepared from a film forming material composed of mainly polysilazane has often insufficient gas barrier performance, so that a film forming composition that can prepare a film having more improved gas barrier performance and a method for preparing a film have been desired.

PRIOR ART DOCUMENTS

Patent Documents

[Patent document 1] Japanese Patent Laid-Open No. 2011-173057
[Patent document 2] Japanese Patent Laid-Open No. 2011-194766
[Patent document 3] Japanese Patent Laid-Open No. 2012-006154
[Patent document 4] Japanese Patent Laid-Open No. 2009-503157
[Patent document 5] Japanese Patent Laid-Open No. 2012-148416
[Patent document 6] U.S. Pat. No. 6,329,487

SUMMARY OF THE INVENTION

Problems to be Solved by the Invention

In view of the above problems, the present invention is to provide a film forming composition that can prepare a film having more excellent gas barrier performance and a method for preparing such a film.

Means for Solving the Problems

The film forming composition according to the present invention is characterized by comprising a polysiloxane represented by the following general formula (1):

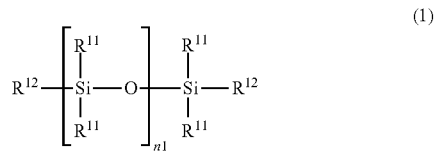

wherein,
$R^{11}$ is a group each independently selected from the group consisting of a hydrogen atom, an alkyl group, an alkenyl group, a cycloalkyl group, an aryl group, an alkoxy group, an amino group, and an alkylsilyl group, and may be substituted by one or more of groups selected from the group consisting of a halogen atom, an alkyl group, an alkoxy group, an amino group, a silyl group and an alkylsilyl group when $R^{11}$ is a group other than a hydrogen atom;
the total number of amino groups and alkoxy groups contained in all of $R^{11}$ in the formula is not more than 5% of the total number of $R^{11}$; and
$R^{12}$ is each independently a hydrocarbon group having 1 to 8 carbon atoms or $-R^{13}-N-R^{14}{}_2$, wherein $R^{13}$ is a hydrocarbon group having 1 to 5 carbon atoms, and $R^{14}$ is each independently hydrogen or a hydrocarbon group having 1 to 3 carbon atoms,
a polysilazane and
an organic solvent.

In addition, the method for preparing a film according to the present invention is characterized by comprising the following steps:
(1) a coating step to coat the above-mentioned film forming composition to form a coating film on a substrate made of an organic material, and
(2) an exposure step to expose the coating film to light.

Furthermore, the film according to the present invention is characterized by being produced through the above-mentioned method.

EFFECTS OF THE INVENTION

According to the present invention, it is possible to prepare a film having excellent gas barrier performance and combining high denseness and thermal stability.

DETAILED DESCRIPTION OF THE INVENTION

Mode for Carrying Out the Invention

Embodiments of the present invention are described below in detail.

Film Forming Composition

The film forming composition according to the present invention comprises a polysiloxane, a polysilazane, and an organic solvent as essential components, and may also optionally contain other additives. Those components are explained below.

Polysiloxane

In the present invention, polysiloxane having a specific structure is used. When a coating film formed from the film forming composition according to the present invention is exposed, such polysiloxane reacts with polysilazane to be described later to form a cured film. Such polysiloxane is represented by the following general formula (1).

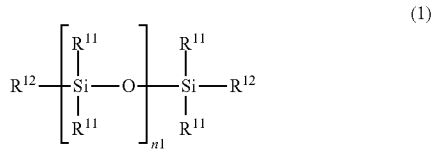

(1)

$R^{11}$ is a group each independently selected from the group consisting of a hydrogen atom, an alkyl group, an alkenyl group, a cycloalkyl group, an aryl group, an alkoxy group, an amino group, and an alkylsilyl group. Those groups may be substituted by one or more of groups selected from the group consisting of a halogen atom, an alkyl group, an alkoxy group, an amino group, a silyl group and an alkylsilyl group. Although those $R^{11}$ form side chain(s) of polysiloxane, it is preferred for $R^{11}$ to contain no highly reactive substituent in order to prevent undesired reactions. Thus, $R^{11}$ is preferably an alkyl group, preferably an alkyl group having 1 to 3 carbon atoms, and most preferably a methyl group. In the formula, $R^{11}$ may be a different group each other, but all are preferably alkyl groups, especially methyl groups.

In addition, $R^{11}$ may contain a reactive group within a range not to impair the effect of the present invention, i.e. in a trace amount. Specifically, if the total number of amino groups and alkoxy groups contained in all of $R^{11}$ is not more than 5%, preferably not more than 3% of the total number of $R^{11}$, the effect of the present invention can be exhibited. On the other hand, if $R^{11}$ contains a hydroxyl group, a carboxyl group, or the like, it becomes difficult to lead to improvement in gas barrier performance, since a highly hydrated hydroxyl group would remain in the membrane. Thus, $R^{11}$ is preferred not to contain any hydroxyl group or carboxyl group.

$R^{12}$ is a terminal group bonded to a silicon atom at the end of polysiloxane main chain. The reaction mechanism when the film forming composition according to the present invention cures is not fully clarified; however, it is estimated that the terminal group portion combines with polysilazane to be described below to stabilize the nitrogen atom in polysilazane, thereby realizing high gas barrier performance. Then, in order to appropriately proceed the reaction of polysiloxane with polysilazane, $R^{12}$ is required to be specific ones.

Typically, $R^{12}$ is a hydrocarbon group having 1 to 8 carbon atoms. In addition, some of the carbon contained in such a hydrocarbon group may be replaced with nitrogen. The nitrogen-substituted hydrocarbon group includes $-R^{13}-N-R^{14}_2$, wherein $R^{13}$ is a hydrocarbon group having 1 to 5 carbon atoms and $R^{14}$ is each independently hydrogen or a hydrocarbon group having 1 to 3 carbon atoms. $R^{12}$ having an appropriate reactivity is selected as mentioned above. Specifically, $R^{12}$ is preferably a group selected from the group consisting of a methyl group, an ethyl group, a propyl group, an aminomethyl group, an aminoethyl group, an aminopropyl group, or N-ethylamino-2-methylpropyl group. Incidentally, a plurality of $R^{12}$ are included in polysiloxane represented by the formula (1), and they may be identical or different.

Although the molecular weight of polysiloxane used in the present invention is not particularly limited, for example, it is preferably in the range of 500 to 100,000, more preferably 1,000 to 50,000 in terms of polystyrene.

Polysilazane

Although polysilazane used in the film forming composition according to the present invention is not particularly limited, it typically has a structural unit represented by the following general formula (2).

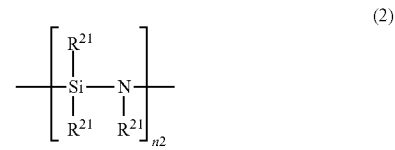

(2)

$R^{21}$ is each independently a group selected from the group consisting of a hydrogen atom, an alkyl group, an alkenyl group, a cycloalkyl group, an aryl group, an alkoxy group, an amino group, and a silyl group. When $R^{21}$ is a group other than a hydrogen atom, $R^{21}$ may be substituted by one or more of groups selected from the group consisting of a halogen atom, an alkyl group, an alkoxy group, an amino group, a silyl group, and an alkylsilyl group. Specific examples of $R^{21}$ having such a substituent include a fluoroalkyl group, perfluoroalkyl group, a silylalkyl group, trisilylalkyl group, an alkylsilylalkyl group, a trialkylsilyl group, an alkoxysilylalkyl group, a fluoroalkoxy group, a silylalkoxy group, an alkylamino group, a dialkylamino group, an alkylaminoalkyl group, an alkylsilyl group, a dialkylsilyl group, an alkoxysilyl group, a dialkoxysilyl group, and a trialkoxysilyl group. Among them, $R^{21}$ is, each independently, preferably a group selected from the group consisting of (a) hydrogen, (b) an alkyl group such as a methyl group, an ethyl group, or a propyl group, (c) an alkenyl group such as a vinyl group, or an allyl group, (d) an aryl group such as a phenyl group, (e) an alkylsilyl group such as a trimethylsilyl group, and (f) an alkoxysilyl group such as a triethoxysilylpropyl group.

Polysilazane comprising mainly a structural unit represented by the above-mentioned general formula (2) has a straight chain structure. However, it is also possible in the present invention to use polysilazane having other structure, namely, a branched chain structure or a cyclic structure. Such polysilazane comprises structures of the following formulae.

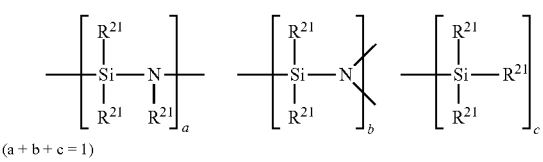

(a + b + c = 1)

Polysilazane represented by those formulae is categorized into organopolysilazane, wherein $R^{21}$ contains an organic group, and perhydropolysilazane, wherein all of $R^{21}$ are hydrogen. Those polysilazane can be produced by any conventionally known methods.

It is also possible to use metallopolysilazane modified with a metal compound at a part of those polysilazane, borosilazane containing boron, polysiloxazane containing a silicone structure, or the like. Incidentally, polysilazane conveniently called in the present invention includes also those modified polysilazane. In the present invention, it is also possible to use those polysilazane in combination of two or more.

Although the molecular weight of polysilazane used in the present invention is not particularly limited, for example, it is preferably in the range of 500 to 20,000, more preferably 1,000 to 10,000 in terms of polystyrene.

Organic Solvent

The film forming composition according to the present invention comprises a solvent capable of dissolving the above-mentioned polysiloxane and the above-mentioned polysilazane. The solvent is not particularly limited as long as it can dissolve the components to be used. Preferred examples of the solvent include the following:

(a) an aromatic hydrocarbon compound, such as benzene, toluene, xylene, ethylbenzene, diethylbenzene, trimethylbenzene, triethylbenzene and tetrahydro-naphthalene;

(b) a saturated hydrocarbon compound, such as n-pentane, i-pentane, n-hexane, i-hexane, n-heptane, i-heptane, n-octane, i-octane, n-nonane, i-nonane, n-decane and i-decane;

(c) an alicyclic hydrocarbon compound, such as ethylcyclohexane, methylcyclohexane, cyclohexane, cyclohexene, p-menthane, decahydronaphthalene, dipentene and limonene;

(d) an alkyl ether, such as dipropyl ether, dibutyl ether, diethyl ether, dipentyl ether, dihexyl ether, methyl tertiary butyl ether (hereinafter, referred to as MTBE) and anisole; and (e) a ketone, such as methyl isobutyl ketone (hereinafter, referred to as MIBK).

Among them, (a) an aromatic hydrocarbon compound, (b) a saturated hydrocarbon compound, (c) an alicyclic hydrocarbon compound, and (d) an alkyl ether are preferred, and, in particular, xylene and dibutyl ether are preferred.

Those solvents can be used properly in combination of two or more, so as to control the evaporation rate of the solvent, to reduce the hazardousness to the human body or to control the solubility of the components.

It is also possible to use commercially available solvents as such a solvent. For example, Pegasol 3040, Exxsol D30, Exxsol D40, Exxsol D80, Solvesso 100, Solvesso 150, Isopar H, Isopar L (trade name: manufactured by Exxon Mobil Corporation), New Solvent A, Cactus Fine SF-01, Cactus Fine SF-02 (trade name: manufactured by JX Nippon Oil & Energy Corporation), Shellsol MC311, Shellsol MC811, Sol Eight Deluxe, New Shell Bright Sol (trade name: manufactured by Shell Chemicals Japan Ltd.) are commercially available and those can be also used. Incidentally, if a mixture of solvents is used, the content of an aromatic hydrocarbon is preferably not more than 30 wt. % based on the total weight of the solvent mixture from the viewpoint of reducing the hazardousness to the human body.

Other Components

In the present invention, the film forming composition can also comprise an amine compound or a metal complex compound. Those compounds function as a catalyst at the time when the composition coated on a substrate performs a curing reaction.

As the amine compound, any ones may be used, and their preferable examples include aliphatic amines, aromatic amines, or heterocyclic amines. The aliphatic amine or aromatic amine may be either of primary amine, a secondary amine or tertiary amine. In addition, those may be monoamines, diamines or triamines etc., i.e. the number of nitrogen atom can be arbitrary. Examples of the heterocyclic amine include compounds comprising a pyrrole ring, a pyridine ring, a pyrazine ring, a pyrimidine ring, a triazole ring, and the like. In addition, those amine compounds may be substituted by any substituent, for example, a group selected from the group consisting of an alkoxy group, an alkylene group, a silyl group, and an alkylsilyl group.

Specific examples of the preferred amine compound include dipropylamine, diisopropylamine, tripropylamine, butylamine, dibutylamine, tributylamine, isobutylamine, diisobutylamine, tert-butylamine, pentyl-amine, tripentylamine, hexylamine, N-methylhexylamine, N,N-dimethylhexylamine, N,N-dimethyl-2-ethylhexyl-amine, heptylamine, octylamine, di-n-octylamine, N-methyl-di-n-octylamine, tri-n-octylamine, N,N,N',N'-tetramethyldiaminomethane, N,N'-dimethylethylenediamine, N,N,N',N'-tetramethylethylenediamine, N,N,N',N'-tetramethyl-1,3-propanediamine, N,N,N',N'-tetramethyl-1,4-butanediamine, N,N-di-tert-butyl-ethylenediamine, N,N,N',N'-tetramethylhexamethylene-diamine, N,N,N',N'-tetramethyl-1,8-octanediamine, allyl-amine, diallylamine, triallylamine, N-methyldiallylamine, N,N-dimethylallylamine, benzylamine, dibenzylamine, N-methylbenzylamine, N,N-dimethylbenzylamine, pyrrole, pyrroline, pyridine, picoline, lutidine, pyrazine, aminopyridine, aminomethylpyridine, phenylpyridine, vinylpyridine, aminopyrazine, 2-methoxyethylamine, 3-methoxypropylamine, 3-ethoxypropylamine, 3-propoxy-propylamine, 3-isopropoxypropylamine, 3-butoxypropylamine, bis(2-aminoethyl ether), bis(3-aminopropyl ether), 3-(2-dimethylaminoethoxy) propylamine, hexamethyldisilazane, tetramethyldisilazane, and heptamethyldisilazane.

Incidentally, the amine compound may be selected from any one as long as it does not impair the effect of the present invention. However, if an alcohol amine or some of N-heterocyclic amines is used, it is necessary to note that Si—O bond may increase during the film curing.

Any metal complex compound also can be used as long as it is possible to promote the curing reaction of the film. Specifically, the compound comprising a metal selected from the group consisting of nickel, titanium, platinum, rhodium, cobalt, iron, iridium, aluminum, ruthenium, palladium, rhenium, and tungsten is preferable. In addition, the compound comprising a ligand selected from the group consisting of an acetylacetonate group, a carbonyl group, and a carboxylate group is preferable. Here, the carboxylate group is preferably a residue of carboxylic acid selected from formic acid, acetic acid, propionic acid, butyric acid, octanoic acid, lauric acid, stearic acid, oleic acid, lactic acid, a succinic acid and citric acid.

Preferred specific examples of the metal complex compound include tris(acetylacetonato)aluminum, tris(acetylacetonato)iron, tris(acetylacetonato)rhodium, tris(acetylacetonato)cobalt, tris(acetylacetonato)-ruthenium, bis(acetylacetonato)palladium, tungsten hexacarbonyl, triruthenium dodecacarbony, dirhenium dodecacarbonyl, palladium acetate, palladium propionate, nickel benzoate, nickel octanoate, nickel oleate, iron formate, cobalt benzoate, cobalt citrate, cobalt formate, rhodium triacetate, dirhodium tetraacetate, titanium oleate, aluminum gluconate, aluminum benzoate, and aluminum butylate.

The film forming compositions according to the present invention may also optionally contain other additive components. Such components include, for example, a viscosity modifier, a cross-linking accelerator, and the like. In addition, it may contain a phosphorus compound, for example, tris (trimethylsilyl) phosphate, and the like for the purpose of Na-gettering effect when used in a semiconductor device.

Film Forming Composition

The film forming composition according to the present invention comprises dissolving or dispersing the above polysiloxane, the above polysilazane and optionally other additives in the above organic solvent. There is no particular restriction on the order of dissolving the components in the organic solvent. Further, the components may be beforehand reacted and then the solvent may be replaced.

Further, content of the above components changes according to the application of the desired composition. The compounding ratios of polysiloxane and polysilazane can be properly adjusted according to the purpose. In general, it is preferable that the compounding ratio of polysiloxane is more, since there causes a tendency that gas barrier performance becomes higher. Thus, the compounding amount of polysiloxane is preferably not less than 0.01 parts by weight, more preferably not less than 0.1 parts by weight based on 100 parts by weight of polysilazane. In addition, the less compounding ratio of polysiloxane is preferred to promote the progress of the film forming reaction. Therefore, the compounding amount of polysiloxane is preferably not more than 25 parts by weight, more preferably not more than 8 parts by weight based on 100 parts by weight of the polysilazane.

Further, content of the polymer components consisting of polysiloxane and polysilazane in the present invention is preferably 0.1 to 40% by weight, more preferably 0.1 to 30% by weight based on the total weight of the composition in order to form a film having sufficient film thickness. Furthermore, when the composition contains an amine compound, it is preferably not less than a certain amount in order to sufficiently promote the curing reaction, and it is preferably not more than a certain amount from the viewpoint of storage stability of the film forming composition. Thus, content of the amine compound is preferably 0.005 to 1.00 mmol, more preferably 0.01 to 0.60 mmol based on 1 g of the polymer. In addition, when the composition contains the metal complex compound, it is preferably not less than a certain amount in order to sufficiently promote the curing reaction, and it is preferably not more than a certain amount from the viewpoint of storage stability of the film forming composition. Thus, content of the metal complex compound is preferably 0.005 to 0.50 mmol, more preferably 0.01 to 0.20 mmol based on 1 g of the polymer.

Method for Preparing a Film

In addition, the method for preparing a film according to the present invention comprises:

(1) a coating step to coat the above film forming composition on a substrate to form a coating film thereon, and (2) an exposure step to expose the coating film to light.

The substrate for coating the film forming composition is not particularly limited, and selected from any of organic materials, inorganic materials, metals, and the like. The film formed according to the present invention is characterized by high gas barrier performance. Therefore, it is preferred that a film is formed on the surface of a substrate made of an organic material, since a film material having high gas barrier performance can be obtained. Those organic materials preferably include plastic films of polyethylene naphthalate, polyethylene terephthalate, polystyrene, polypropylene, polyethylene, polyimide, polyamide, cellulose acetate, acrylic, polycarbonate, vinyl chloride, and the like. Among them, polyethylene naphthalate or polyethylene terephthalate is particularly preferred from the viewpoint of heat resistance and transparency.

Incidentally, the film may be formed not only one side of a substrate but also optionally on both sides of the substrate, in which case it is necessary to select a substrate which is suitable for that purpose.

In the coating step (1), the film forming composition described above is coated to the surface of the above substrate. In the method for preparing a film according to the present invention, the film forming composition is coated to one or both of the substrate surfaces.

As the method for coating the film forming composition to the substrate surface, it is possible to use conventionally known methods. They include, for example, a spin coating method, a dip coating method, a spray coating method, a roll coating method, a transfer method, a slit coating method, a bar coating method, and the like. The thickness of the coating film after coated is preferably thicker in order for the formed film to exhibit sufficient gas barrier performance. Specifically, it is preferably not less than 10 nm, more preferably not less than 50 nm. In addition, it is preferred that the thickness of the coating film after coated is appropriately set, so that it can be efficiently cured in the exposure step to be described below. Specifically, it is preferably not more than 900 nm, more preferably not more than 500 nm. Incidentally, in the case of forming a film on both sides of the substrate, it may be coated sequentially on each side, or may be coated simultaneously on both sides.

The coating film formed on the substrate surface is optionally dried and the excess organic solvent is removed. Especially, light of a relatively short wavelength is used in the exposure step to be described below, so that it is preferable to remove as much as possible an organic solvent, which tends to absorb light of short-wavelength region. In this case, the drying can be done more efficiently if carried out at a relatively high temperature.

Further, the drying can also be carried out under reduced pressure. That is, by applying negative pressure to the substrate after coated by means of a vacuum pump, a rotary pump, and the like, the evaporation of the solvent in the coating film is facilitated, then the drying can be accelerated.

The coating film from which excess solvent is removed by drying can be also optionally subjected to a blowing treatment using an inert gas such as nitrogen. It is possible to increase light irradiating efficiency by removing the coating film surface deposits through such a treatment. Furthermore, it is possible by irradiating infrared ray to remove the solvent and the like adhered to the surface.

The coating film obtained in this way is subsequently subjected to an exposure process. Light irradiation conditions in the exposure step are appropriately selected according to thickness, composition, hardness, and the like of the coating film to be formed.

Light to be irradiated in the exposure step has a maximum peak wavelength of preferably 161 to 248 nm, preferably 165 to 180 nm. As light source of such a light, any one can be used as long as it can emit light of the above wavelength. Typically, xenon excimer laser is used. In addition, it is also possible to use only the required radiation light through a filter or spectrometer by means of a lamp which emits light having a broad wavelength range.

In the method for preparing a film according to the present invention, it is considered that, by means of the exposure step, a terminal group portion in the above polysiloxane reacts with polysilazane to form a film having excellent gas barrier performance. Incidentally, since in accordance with the wavelength of the irradiated light, the portion that curing is accelerated differs in the depth direction in the coating film, it is possible to select the wavelength of light to be irradiated depending on the purpose. That is, the curing of the deeper portions of the coating film can be promoted by irradiating long-wavelength light, and also the curing of the shallower portions of the coating film can be further facilitated by irradiating short-wavelength light.

Although the atmosphere for conducting the exposure is arbitrarily selected depending on the composition, and the like of the intended film, it is preferable to carry out the light irradiation in an atmosphere, in which oxygen does not penetrate into the film, i.e. in an atmosphere of less oxygen. Specifically, the oxygen content in the atmosphere is preferably not more than 1000 ppm, more preferably not more than 100 ppm. To satisfy such a condition, it is possible to carry out the light irradiation in vacuum or under reduced pressure and under an inert gas atmosphere. Moreover, it is also effective to carry out the light irradiation after the pressure is reduced and then introducing an inert gas. Incidentally, as the inert gas here, nitrogen, argon, helium and mixed gas thereof, and the like are used. In this case, nitrogen is preferably used from the viewpoint of handleability. At this time, nitrogen gas is inert, so that it may neither be incorporated into the film, nor increase the composition ratio of nitrogen. Furthermore, it is possible to carry out the light irradiation not only in a sealed container but also in a flowing inert gas. In addition, it is also possible, for example, to carry out ultraviolet radiation in ammonia, dinitrogen oxide, and a mixed gas thereof with inert gas. In this case, since ammonia and dinitrogen oxide can become a nitrogen source when a film having a high Si—N content is constituted, gas barrier performance can be further improved by raising the Si—N content in the film using them.

In the exposure step, it is also possible to heat the coating film simultaneously with the light irradiation. It is possible to further accelerate the curing reaction by such a heating. Further, after the exposure step, it is also possible to promote the curing reaction by additional heating. Heating method is not particularly limited and can be selected from any method such as a method of heating the stage and the like for setting a substrate and a method of heating the atmosphere gas. However, in the case that an organic material is used as a substrate, it may be damaged due to too high heating temperature, so that the heating temperature is preferably lower. Specifically, the temperature while a film is formed by curing the coating film is preferably not higher than 200° C.

The film thus formed is excellent in not only gas barrier performance but also thermal stability and transparency etc. The film can be used as a gas barrier film for display devices, semiconductor devices, and the like, and also as a protective film or insulating film.

The present invention is further explained below by use of the following examples.

Preparation of the Film Forming Composition

Polysiloxane represented by the formulae (1A) to (1G) and polysilazane represented by the formulae (2A) to (2C) were prepared. Incidentally, polysilazane was synthesized using dichlorosilane, methyl dichlorosilane and the like as starting materials in accordance with the method described in Patent Document 6 etc.

20 g of polysilazane and 60 g of dibutyl ether were added to a 500 ml glass beaker to give a polysilazane solution by mixing. Separately, predetermined amount of polysiloxane and dibutyl ether were mixed in a 50 ml glass beaker to prepare a solution of 20 g in total. The resulting polysiloxane solution was added to the polysilazane solution and then bubbling agitation was conducted by feeding dry nitrogen for 3 minutes to prepare a film forming composition, which was then diluted with dibutyl ether so as to obtain a desired film thickness.

Formation of a Gas Barrier Film

The prepared film forming composition was coated using a spin coater on a polyethylene naphthalate film having thickness of 125 μm. Subsequently, the coated film was placed in the exposure apparatus, and the oxygen concentration was made not more than 100 ppm by introducing nitrogen into the apparatus. Thereafter, exposure treatment was carried out for 30 minutes using a light source having a maximum peak wavelength of 172 nm, thereby obtaining a film. In this case, the illuminance of the light was 8 mW/cm$^2$. Incidentally, the measurement of the illuminance was conducted using an accumulated UV meter UIT-250 and a light receiving unit VUV-5172 (respectively trade names, manufactured by Ushio Inc.).

Evaluation

Using DELTAPERM-UH gas permeation measurement instrument (manufactured by Technolox Ltd.), moisture vapor permeability was measured at 40° C. in 90% relative humidity atmosphere with respect to a film substrate before coating as well as a film substrate with the film thereon obtained by the above-mentioned method. Moisture vapor permeability of the film substrate before coating was 1 g/m$^2$/day. Further, using an ellipsometer, the thickness of the obtained film was measured. The film thickness was respectively 200 nm. The obtained results were as shown in Table 1.

TABLE 1

| | polysiloxane structure | weight average molecular weight | polysilazane | polysilazane:polysiloxane ratio | water vapor transmission rate g/m²/day |
|---|---|---|---|---|---|
| Example 1 | 1A | 5000 | 2A | 100:5 | $8.2 \times 10^{-3}$ |
| Example 2 | 1A | 5000 | 2A | 100:3 | $7.1 \times 10^{-3}$ |
| Example 3 | 1A | 5000 | 2A | 100:1 | $2.4 \times 10^{-3}$ |
| Example 4 | 1A | 5000 | 2A | 100:0.5 | $8.9 \times 10^{-3}$ |
| Example 5 | 1A | 20000 | 2A | 100:5 | $8.4 \times 10^{-3}$ |
| Example 6 | 1A | 20000 | 2A | 100:1 | $6.6 \times 10^{-3}$ |
| Example 7 | 1B | 6000 | 2A | 100:5 | $9.8 \times 10^{-3}$ |
| Example 8 | 1B | 6000 | 2A | 100:1 | $8.1 \times 10^{-3}$ |
| Example 9 | 1B | 10000 | 2A | 100:5 | $6.5 \times 10^{-3}$ |
| Example 10 | 1B | 10000 | 2A | 100:3 | $5.3 \times 10^{-3}$ |
| Example 11 | 1B | 10000 | 2A | 100:0.5 | $7.6 \times 10^{-3}$ |
| Example 12 | 1B | 30000 | 2A | 100:5 | $7.4 \times 10^{-3}$ |
| Example 13 | 1B | 30000 | 2A | 100:1 | $5.8 \times 10^{-3}$ |
| Example 14 | 1C | 2000 | 2A | 100:5 | $7.5 \times 10^{-3}$ |
| Example 15 | 1C | 2000 | 2A | 100:3 | $6.6 \times 10^{-3}$ |
| Example 16 | 1C | 2000 | 2A | 100:1 | $8.4 \times 10^{-3}$ |
| Example 17 | 1D | 3000 | 2A | 100:5 | $7.2 \times 10^{-3}$ |
| Example 18 | 1D | 3000 | 2A | 100:3 | $6.4 \times 10^{-3}$ |
| Example 19 | 1D | 3000 | 2A | 100:1 | $4.9 \times 10^{-3}$ |
| Example 20 | 1A | 5000 | 2B | 100:1 | $8.4 \times 10^{-2}$ |
| Example 21 | 1A | 5000 | 2C | 100:1 | $7.8 \times 10^{-2}$ |
| Comparative Example 1 | 1E | 10000 | 2A | 100:2 | $3.8 \times 10^{-2}$ |
| Comparative Example 2 | 1F | 5000 | 2A | 100:2 | $3.0 \times 10^{-2}$ |
| Comparative Example 3 | 1G | 5000 | 2A | 100:2 | $2.8 \times 10^{-2}$ |
| Comparative Example 4 | non | — | 2A | 100:0 | $4.7 \times 10^{-2}$ |
| Comparative Example 5 | non | — | 2B | 100:0 | $1.2 \times 10^{-1}$ |

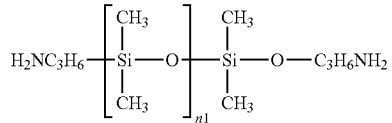

(1A)

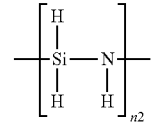

(2A)

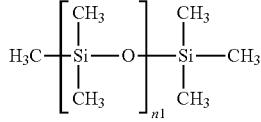

(1B)

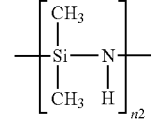

(2B)

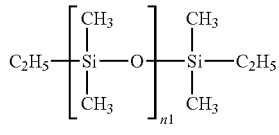

(1C)

-continued

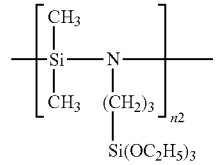

(2C)

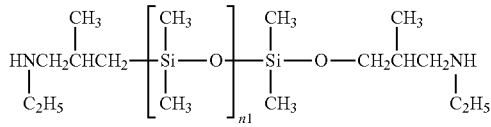

(1D)

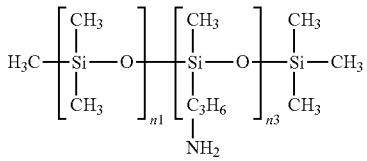

(1E)

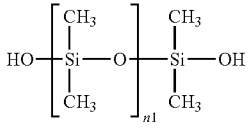

(1F)

-continued

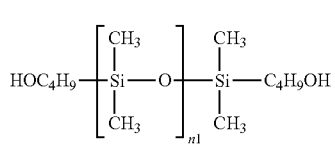

The invention claimed is:

1. A film forming composition consisting essentially of:
a polysiloxane represented by the following general formula (1):

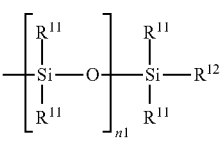

a polysilazane and
an organic solvent,
wherein,
$R^{11}$ is a group each independently selected from the group consisting of a hydrogen atom, an alkyl group, an alkenyl group, a cycloalkyl group, an aryl group, an alkoxy group, an amino group, and an alkylsilyl group, and may be substituted by one or more of groups selected from the group consisting of a halogen atom, an alkyl group, an alkoxy group, an amino group, a silyl group and an alkylsilyl group when $R^{11}$ is a group other than a hydrogen atom;
the total number of amino groups and alkoxy groups contained in all of $R^{11}$ in the formula is not more than 5% of the total number of $R^{11}$; and
$R^{12}$ is each independently a hydrocarbon group having 1 to 8 carbon atoms or $-R^{13}-N-R^{14}{}_2$, wherein $R^{13}$ is a hydrocarbon group having 1 to 5 carbon atoms, and $R^{14}$ is each independently hydrogen or a hydrocarbon group having 1 to 3 carbon atoms, wherein n1 is the number of repeat units which cannot be 0.

2. The film forming composition according to claim 1, wherein $R^{11}$ is an alkyl group having 1 to 3 carbon atoms.

3. The film forming composition according to claim 1, wherein $R^{12}$ is a group selected from the group consisting of a methyl group, an ethyl group, a propyl group, an aminomethyl group, aminoethyl group, aminopropyl group, and N-ethylamino-2-methylpropyl group.

4. The film forming composition according to claim 1, wherein the polysilazane has a structural unit represented by the following general formula (2):

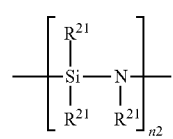

wherein,
$R^{21}$ is a group each independently selected from the group consisting of a hydrogen atom, an alkyl group, an alkenyl group, a cycloalkyl group, an aryl group, an alkoxy group, an amino group, and a silyl group; at least one of $R^{21}$ in the formula is a hydrogen atom; and the group other than hydrogen atom may be substituted by one or more of groups selected from the group consisting of a halogen atom, an alkyl group, an alkoxy group, an amino group, a silyl group, and an alkylsilyl group, wherein n2 is the number of repeat units which cannot be 0.

5. The film forming composition according to claim 4, wherein $R^{21}$ is a group each independently selected from the group consisting of hydrogen, an alkyl group, an alkenyl group, an aryl group, an alkylsilyl group, and an alkoxysilyl group.

6. The film forming composition according to claim 1, wherein the compounding amount of polysiloxane is 0.01 to 25 parts by weight based on 100 parts by weight of the polysilazane.

7. The film forming composition according to claim 1, wherein the organic solvent comprises one or more of an aromatic hydrocarbon, a saturated hydrocarbon compound, an alicyclic hydrocarbon compound or an alkyl ether.

8. A method for preparing a film comprising the following steps:
(1) a coating step to coat the film forming composition according to claim 1 on a substrate to form a coating film thereon, and
(2) an exposure step to expose the coating film to light.

9. A method for preparing a film according to claim 8, wherein the substrate is a plastic film.

10. A method for preparing a film according to claim 8, wherein thickness of the coating film is not less than 10 nm and not more than 900 nm.

11. A method for preparing a film according to claim 8, wherein wavelength of the light is 161 to 248 nm.

12. A method for preparing a film according to claim 8, wherein the exposure step is carried out in an inert gas atmosphere.

13. A method for preparing a film according to claim 8, wherein the coating film is not subjected to the temperature of 200° C. or higher while a film is formed by curing the coating film.

14. A film produced by the method according to claim 8.

15. The film forming composition according to claim 2, wherein $R^{12}$ is a group selected from the group consisting of a methyl group, an ethyl group, a propyl group, an aminomethyl group, aminoethyl group, aminopropyl group, and N-ethylamino-2-methylpropyl group.

16. The film forming composition according to claim 2, wherein the polysilazane has a structural unit represented by the following general formula (2):

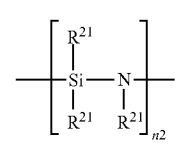

wherein,
$R^{21}$ is a group each independently selected from the group consisting of a hydrogen atom, an alkyl group, an alkenyl group, a cycloalkyl group, an aryl group, an alkoxy group, an amino group, and a silyl group; at least one of $R^{21}$ in the formula is a hydrogen atom; and the group other than hydrogen atom may be substituted by one or more of groups selected from the group consisting of a halogen atom, an alkyl group, an alkoxy group, an amino group, a silyl group, and an alkylsilyl group, wherein n2 is the number of repeat units which cannot be 0.

17. The film forming composition according to claim 16, wherein $R^{21}$ is a group each independently selected from the group consisting of hydrogen, an alkyl group, an alkenyl group, an aryl group, an alkylsilyl group, and an alkoxysilyl group.

18. The film forming composition according to claim 1, wherein the film forming composition further comprises an amino compound or a metal complex compound.

19. The film forming composition according to claim 1, wherein the polysiloxane represented by the general formula (1) is selected from the group consisting of

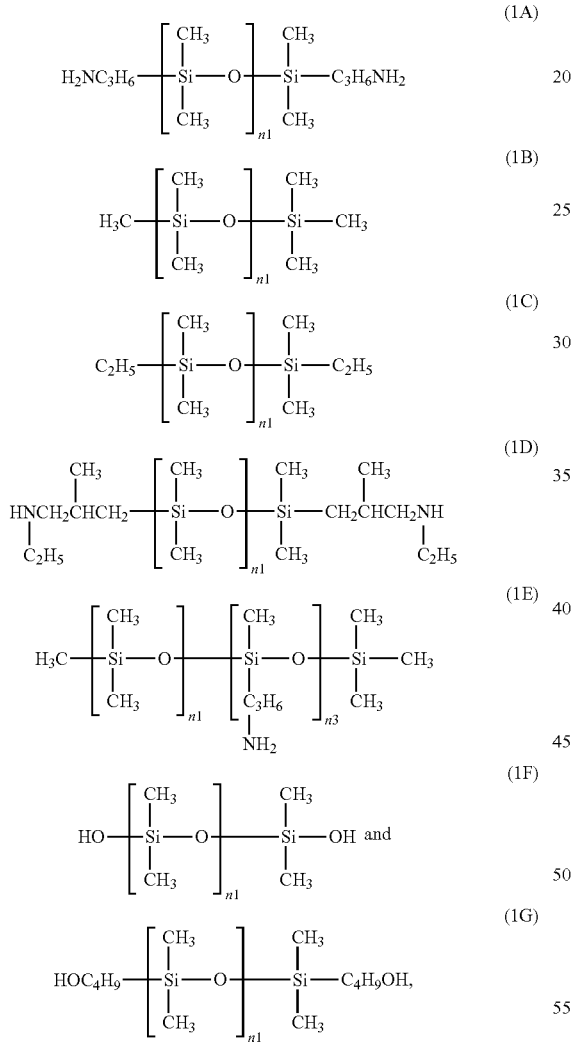

wherein n1 and n3 denote the number of repeat units which cannot be 0, and further where the polysilazane has a structural unit selected from the group consisting of

(2A)

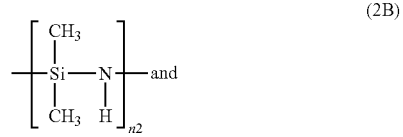
(2B)

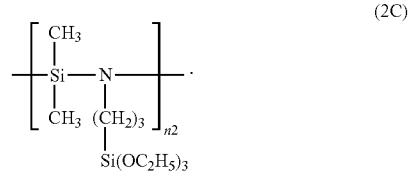
(2C)

wherein n2 is the number of repeat units which cannot be 0.

20. A film forming composition consisting of:
a polysiloxane represented by the following general formula (1):

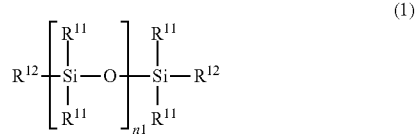
(1)

a polysilazane having a molecular weight of 1,000 to 50,000 and
an organic solvent,
wherein,
$R^{11}$ is a group each independently selected from the group consisting of a hydrogen atom, an alkyl group, an alkenyl group, a cycloalkyl group, an aryl group, an alkoxy group, an amino group, and an alkylsilyl group, and may be substituted by one or more of groups selected from the group consisting of a halogen atom, an alkyl group, an alkoxy group, an amino group, a silyl group and an alkylsilyl group when $R^{11}$ is a group other than a hydrogen atom;
the total number of amino groups and alkoxy groups contained in all of $R^{11}$ in the formula is not more than 5% of the total number of $R^{11}$; and
$R^{12}$ is each independently a hydrocarbon group having 1 to 8 carbon atoms or —$R^{13}$—N—$R^{14}_2$, wherein $R^{13}$ is a hydrocarbon group having 1 to 5 carbon atoms, and $R^{14}$ is each independently hydrogen or a hydrocarbon group having 1 to 3 carbon atoms, wherein n1 is the number of repeat units which cannot be 0.

* * * * *